United States Patent
Henderson et al.

(10) Patent No.: US 7,234,481 B2
(45) Date of Patent: Jun. 26, 2007

(54) SAFETY PRESSURE RELIEF DEVICE

(75) Inventors: Thomas Henderson, Seaton Delaval (GB); Phillip G. Coulson, Blyth (GB); Mark Hayles, North Shields (GB)

(73) Assignee: Elfab Limited, Tyne Wear NE (GB)

( * ) Notice: Subject to any disclaimer, the term of this patent is extended or adjusted under 35 U.S.C. 154(b) by 70 days.

(21) Appl. No.: 10/491,962

(22) PCT Filed: Oct. 4, 2002

(86) PCT No.: PCT/GB02/04516

§ 371 (c)(1),
(2), (4) Date: Sep. 23, 2004

(87) PCT Pub. No.: WO03/031853

PCT Pub. Date: Apr. 17, 2003

(65) Prior Publication Data

US 2005/0067010 A1    Mar. 31, 2005

(30) Foreign Application Priority Data

Oct. 9, 2001    (GB) .................................. 0124212.2

(51) Int. Cl.
   *F16K 17/16*     (2006.01)
   *B21D 39/08*     (2006.01)
   *F16K 17/40*     (2006.01)

(52) U.S. Cl. ............................... 137/68.26; 137/68.27; 220/89.2; 72/57; 72/379.2

(58) Field of Classification Search ............. 137/68.25, 137/68.26, 68.27; 220/89.2; 72/55, 57, 72/58, 379.2
See application file for complete search history.

(56) References Cited

U.S. PATENT DOCUMENTS

| 3,327,894 A | * | 6/1967 | Ferris ....................... 137/68.27 |
| 3,667,644 A | * | 6/1972 | Fortmann .................. 220/89.2 |
| 4,404,982 A | * | 9/1983 | Ou ........................... 137/68.25 |
| 4,576,303 A | * | 3/1986 | Mundt et al. .............. 220/89.2 |
| 4,580,690 A | * | 4/1986 | Mulawski .................. 220/89.2 |
| 5,558,114 A |   | 9/1996 | Strelow |
| 5,570,803 A | * | 11/1996 | Farwell ..................... 220/89.2 |
| 6,006,938 A | * | 12/1999 | Mozley et al. ............. 220/89.2 |
| 6,792,964 B2 | * | 9/2004 | Farwell et al. ........... 137/68.25 |
| 2001/0011471 A1 | | 8/2001 | Cullinane et al. |

FOREIGN PATENT DOCUMENTS

| EP | 0 556 512 A1 | 8/1993 |
| GB | 2 093 527 A | 9/1982 |
| WO | WO 02/29296 A1 | 4/2002 |

\* cited by examiner

*Primary Examiner*—John Rivell
(74) *Attorney, Agent, or Firm*—Stites & Harbison PLLC; Ross F. Hunt, Jr.

(57) ABSTRACT

A safety pressure relief device comprises an annular flange portion (22), a concave/convex dome portion (24) and a transition portion (26) between the flange portion (22) and the dome portion (24), the transition portion (26) comprising a linear extent (28) extending from the annular flange portion (22) at a first acute angle ($\theta_1$) to the plane of the flange portion (22), a tangent to the dome portion (24) at its junction with the transition portion (26) making a second acute angle ($\theta_2$) with the plane of the flange portion (22) which is greater than said first angle ($\theta_1$), a line of weakness being formed in and around part at least of the linear extent (28) of the transition portion (26).

9 Claims, 4 Drawing Sheets

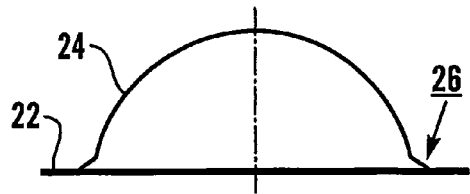
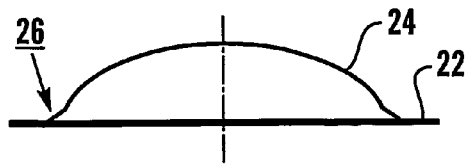
Fig.7a    Fig.7b
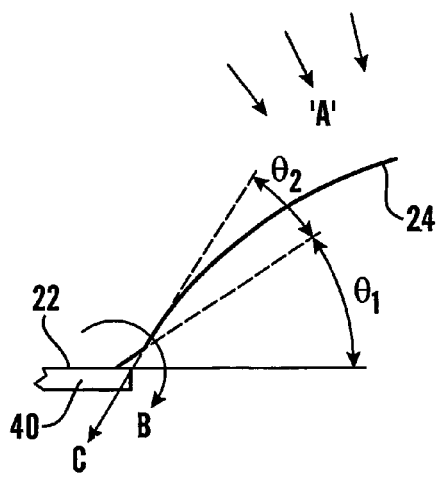
Fig.8
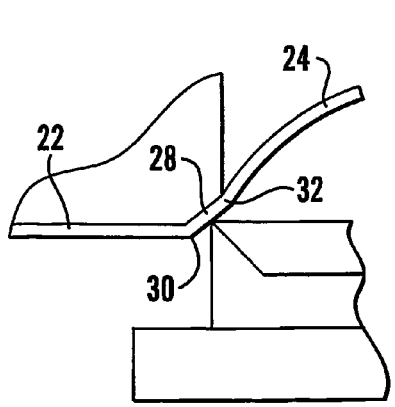
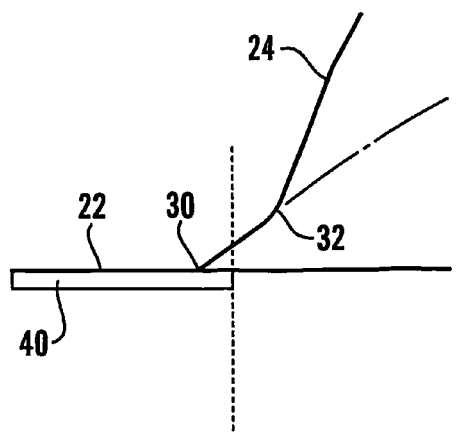
Fig.9    Fig.10

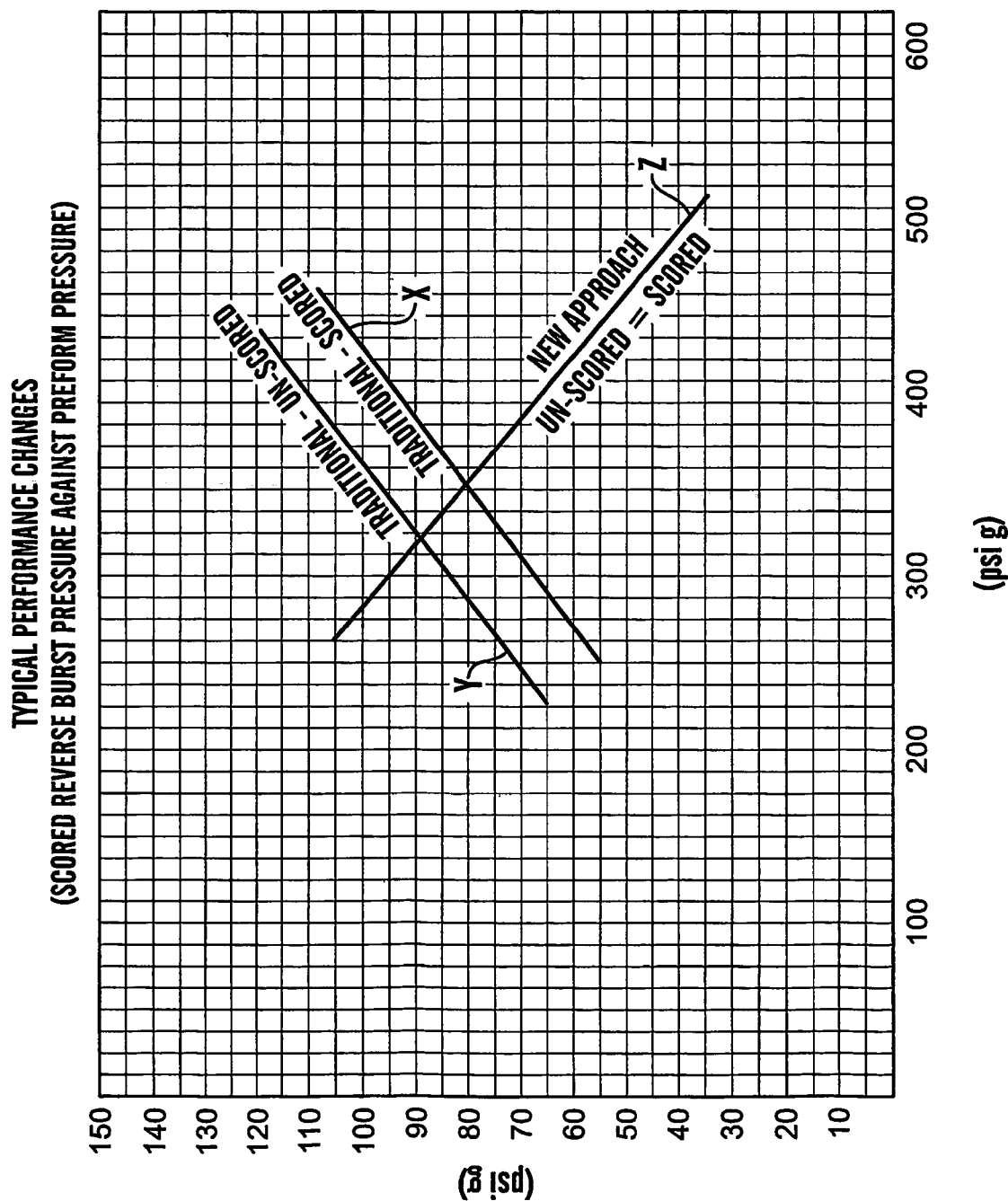

SAFETY PRESSURE RELIEF DEVICE

TECHNICAL FIELD

The invention relates to safety pressure relief devices, and more particularly to reverse buckling discs which are designed to rupture reliably at relatively low pressures.

BACKGROUND

It is conventional practice to provide reverse buckling discs comprising an annular peripheral flange portion bounding an integral concave/convex dome portion, the disc being provided with one or more scores positioned to encourage opening of the disc on reversal thereof.

A currently preferred position for the score is around the dome portion adjacent the transition region between the dome portion and the flange portion, such a score being in a position of relatively high stress, and providing maximum free flow area for fluid subsequent to tearing of the collapsed reversed dome portion along the score.

Manufacture of such reverse buckling discs, however, poses a number of problems, both economical and practical.

One current method of manufacture is, with reference to FIG. 1, to provide a pre-form 2 incorporating a hemisphere the shape of which conforms with that of the dome portion 4 of the desired disc, to form the dome portion 4 of the disc in the pre-form 2, and then to score the dome portion 4 with an associated blade 6 whilst the dome portion is supported in the pre-form 2.

However it is necessary to provide separate tooling for each and every deliverable range of burst pressure of disc, which is clearly financially impractical.

Alternative known methods are shown in FIGS. 2 to 4, FIG. 2 showing a pre-form 8 which can be used for a range of anticipated dome heights all of which are less than that of the hemisphere 10 provided in the pre-form 8. Thus the dome portion 12 of the formed disc terminates below the hemisphere 10, and the scoring is effected by a score blade 14. However, scoring of the dome portion 12 in this manner can, as shown in FIG. 4, damage the dome portion by distorting the unscored reverse of the dome portion 12, which leads to an unreliable product and underlying issues in respect of:

repeatable performance
low product yield
range limitation
reduced in-service cycle life
high maintenance costs for tooling
inability to produce a specific burst pressure
high production costs.

FIG. 3 shows an annular pre-form or anvil 16 with a chamfered or angled lower inner region 18 for accommodating a range of discs in a similar manner to the pre-form of FIG. 2, such an arrangement suffering from the same disadvantages detailed above in respect of FIG. 3.

SUMMARY OF THE INVENTION

It would be desirable to be able to provide reverse buckling discs and a method of manufacture thereof which resulted in reliability of the discs over a wide range of deliverable burst pressures, sizes and materials in a more economical manner than heretofore.

According to one aspect of the present invention there is provided a safety pressure relief device comprising an annular flange portion, a concave/convex dome portion and a transition portion between the flange portion and the dome portion, characterised in that the transition portion comprises a linear extent extending from the annular flange portion at a first acute angle to the plane of the flange portion, a tangent to the dome portion at its junction with the transition portion making a second acute angle with the plane of the flange portion which is greater than said first angle, a line of weakness being formed in and around part at least of the linear extent of the transition portion.

In a preferred embodiment of the invention, the transition between the linear extent and the dome portion is radiused, while it is further preferred that the transition between the linear extent and the flange portion is angular.

Conveniently the first acute angle is between 20° and 50°, preferably 35°, while the value of the second acute angle exceeds that of the first acute angle by at least 1° up to a maximum of about 40°.

According to a further aspect of the invention there is provided a method of manufacturing a safety pressure relief device as defined above, the method comprising the steps of providing an annular pre-form having a lower surface thereto, the circumferential inner corner of the pre-form being chamfered to provide a flat surface extending at an acute angle to the plane of the lower surface of the pre-form, locating a circular disc blank with the outer regions thereof abutting, to be supported by, the lower surface of the pre-form, applying pressure to the disc blank to form a concave/convex dome portion within the hollow interior of the pre-form, an intermediate portion of the disc blank being urged against said flat surface of the pre-form to form a linear transition extent to the disc, and forming a line of weakness in and around part at least of the linear extent whilst said extent abuts said flat surface.

It will be appreciated that, by forming the line of weakness, conveniently a score, in the linear extent of the disc while that extent is supported by the pre-form, any damage to the disc during scoring is eliminated.

BRIEF DESCRIPTION OF THE DRAWINGS

FIGS. 7a and 7b show two alternative discs according to the invention;

FIG. 8 is a detail of FIG. 5 illustrating load application to the scored area of the disc;

FIG. 9 is a detail of FIG. 6;

FIG. 10 is a detail of FIG. 5 to a larger scale, and

FIG. 11 is a diagrammatic representation of comparative performance changes for a given material and type for prior art discs and discs according to the invention.

DESCRIPTION OF THE PREFERRED EMBODIMENTS

Figure 1:
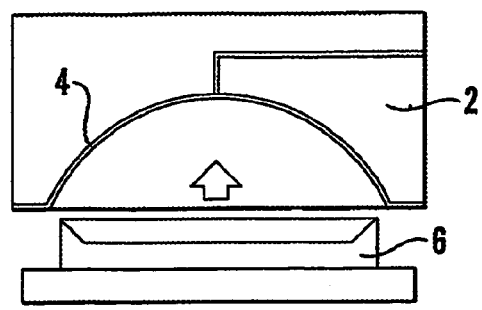
FIGS. 1 to 4 illustrates prior art arrangements detailed above.
Figure 2:
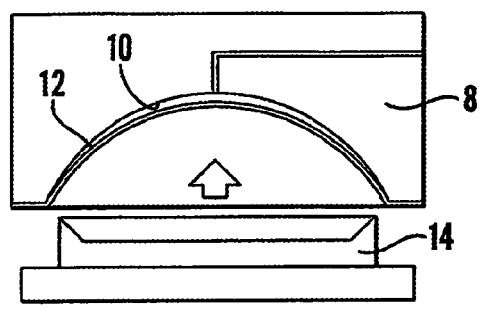
Figure 3:
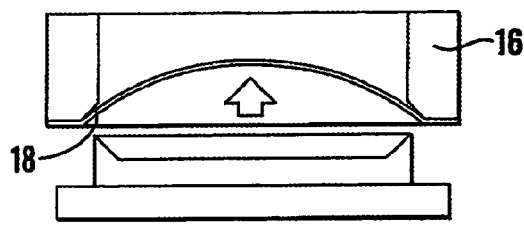
Figure 4:
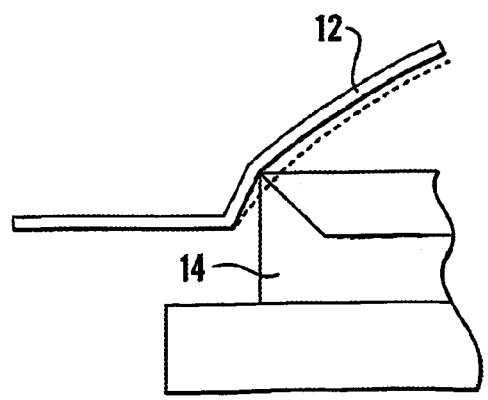
Figure 5:
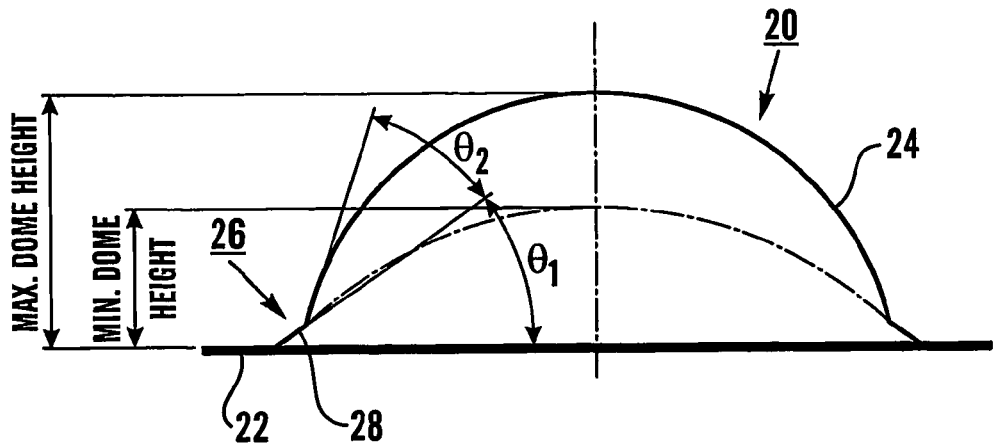
FIG. 5 shows a reverse buckling disc according to the invention.

Referring to FIGS. 5 to 11, the reverse buckling disc according to the invention is illustrated generally at 20 and comprises a flat annular flange portion 22, a concave/convex dome portion 24 and an intermediate transition region 26 including a linear extent 28 making an acute angle $\theta_1$ with the plane of the flange portion 22, there being a sharp corner 30 between the linear extent 28 and the flange portion 22. The transition region 26 further includes a radius 32 blending into the dome portion 24, there being a positive transition between the region 26 and the dome portion 24—i.e. the tangent to the dome portion 24 at its junction with the transition region 26 makes an acute angle $\theta_2$ with the plane of the flange portion 22 that is greater than the angle $\theta_1$.

A circular score (not shown) is formed in the face of the linear extent 28 of the transition region 26 forming a continuation of the concave face of the dome portion 24—i.e. the vent side of the disc—as will be detailed below.

Figure 6:
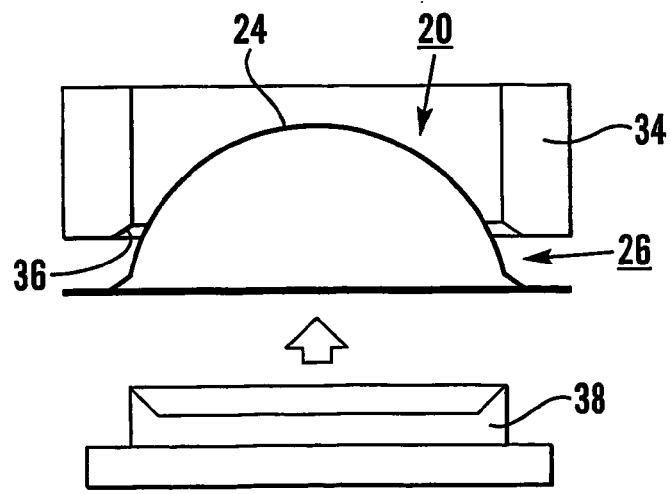
FIG. 6 illustrates the production of the disc of FIG. 5.

Referring in particular to FIG. 6, the disc of the invention is formed using an annular anvil or forming tool 34 the lower inner corner of which is chamfered to provide a flat surface 36 extending at an angle $\theta_1$ to the lower surface of the tool 34. On formation of the disc, the surface 36 defines the linear extent 28 of the transition region 26, and the score is imparted into the linear extent 28 by means of a hardened score blade 38 dimensioned in accordance with the tool 34. The linear extent 28 of the disc 20 is supported against the surface 36 of the tool 34 during formation of the score, whereby the score can be accurately located without any damage to or distortion of the disc 20.

Once the disc 20 has been scored, a support ring 40 is permanently fixed to the vent side of the disc.

The disc of the invention is intended to be installed in a suitable bursting disc holder between pipe flanges in conventional manner.

The disc of the invention is found to have several benefits over conventional products, in particular inversely proportional characteristics whereby the higher the height of the dome portion 24, the lower the pressure required to effect reversal.

Referring in particular to FIG. 8, the arrows A indicate pressure being isentropically applied as a load to the convex face of the dome portion 24, arrow B indicates the turning moment of the applied load about a fulcrum provided by the corner 30 of the disc, and arrow C indicates the direction of the resultant vectored forces on the disc.

It will be appreciated that, as the height of the dome portion 24 increases, so does the angle $\theta_2$ (to an approximate maximum of 40°) whereby the direction of the resultant vectored forces as indicated by arrow C is moved in-bound of the support ring 40 and sets up a turning moment indicated by the arrow B about the fulcrum defined by corner 30.

There is also an increasing disparity between the strength of the dome portion 24 and the transition region 26 of the disc as the curvature of the dome portion (and consequently the height thereof) increases. The blended nature of the radius 32 prevents a sudden focused failure occurring, in essence diffusing the resultant force vector and preventing a buckle failure about the junction between the transition region 26 and the dome portion 24.

The increasing magnitude of the turning moment B about the corner 30 as the height of the dome portion 24 increases (and the strength of the dome portion 24 increases) produces a controllable (linear) repeatable reduction in reverse burst pressure without the need to rely on low dome heights or uncontrollable damage to the dome portion of the disc as has always been necessary heretofore.

This inversely proportional nature of the disc of the invention will allow the discs to be scored whilst at their lowest dome height (highest burst pressure) and subsequently domed higher (to provide a lower burst pressure), thereby allowing 'configuration to burst' of part finished stock.

Further increases in performance (burst pressure and duty) can be achieved by the inclusion of areas of great rigidity in the dome portion 24 of the disc, thereby focussing all the damage during buckle failure into the scored transition region 26 of the disc. This will result in a more damage-resistant product more capable of handling high duties. For example, a honeycomb-like structure of concave/convex domes of varying heights and dimensions may be provided on the dome portion 24.

The preferred value for angle $\theta_1$ is 35°, but this may vary between, for example, 20° and 50°. The height of the dome portion 24 of the disc 20 delivers the tuneable burst pressure of the disc, while the radius 32 between the dome portion 24 and the transition region 26 is a vital part in delivering stable performance and the inversely proportional characteristics. The geometric content of each portion of the disc 20 is a function of the scoring process, free flow area (FFA) requirements and proportionality. Generally speaking, the effective ratio of the transition region 26 to the overall free flow area is 1:4, although ratios between 1:2 and 1:20 can also produce effective results.

The radius 32 is proportional to the type and gauge of the material of the disc 20 and the nominal bore. Generally speaking the radius needs to be greater than 5 times the thinnest material gauge intended for use on any preform tool.

Discs according to the invention have the following attributes:

the burst pressure of the formed disc can be left as it is or changed as part of the scoring process, although it is preferred not to change the burst pressure on scoring;

the provision of the transition region 26 enables scoring to be effected accurately in a known location whereby a score of reduced magnitude is required, resulting in reduced production time, increased product life, increased yield, easier scoring of difficult materials, more accurate performance and reduced tooling maintenance;

controlled variation of inter-relating vectors within the disc allow the production of a wider range of burst pressures from fewer gauges of material using comparatively lower preform energies than heretofore;

the design of the product allows for final 'configure to burst' features to be tuned in after manufacture by applying further forming energy and/or changing the supporting structure approximately 10 to 20% reduction for the starting burst pressure can be achieved);

the nature of the disc allows for a more rigid, damage resistant product than heretofore;

the disc of the invention produces lower burst pressures for higher preform energies—true inverse proportionality—thus offering massive benefits, as the previous boundary for a low pressure reverse product was largely driven by the practical limitations of material gauge and low dome portion heights which led to products that either did not open in service or that were scored so heavily that they opened prematurely due to fatigue;

the design of the disc 20 and its interaction with the support ring 40 is such that the rest position of the disc once ruptured will allow for a previously unattainable flow performance;

as detailed above, the performance of the disc can be enhanced by adding rigidity to the dome portion, for example in the form of a series of hexagon shapes, to create a greater disparity between the area where the score is and where it is not (such an arrangement helps to deliver the objective of putting the score in a location which receives most damage during reversal).

The provision of the support ring 40 serves a number of functions by:

making the finished product more easily handled;

facilitating low energy opening of the product when including teeth;

preventing fragmentation of the disc under high energy conditions;

providing a means for orienting the disc;

providing a means for identifying the product.

Thus the invention provides a disc which surpasses the previous boundaries for performance of low pressure reverse buckling discs.

Current materials accepted, the lowest useable pressures for conventional reverse discs are controlled by the ability to provide enough 'damage' to the scored area during reverse buckling of the initial dome portion. Various design elements can be included to facilitate a range extension to acquire lower burst pressures, but, in general, it has been the height of the dome portion that has driven the issue to date—the lower the height the lower the burst pressure.

Recent developments have seen the provision of a single dent to the centre of the dome portion, and in some cases peripheral indentation, in attempts to lower the burst pressure for given dome portion heights and material gauge/type. These efforts result in damaged dome portions which can no longer vector forces efficiently, and use the damaged area as a failure mode or focus to lower the reverse pressure. However such arrangements are still constrained by the issue of the height of the dome portion and providing sufficient damage to the scored area on reversal to tear the score.

The invention delivers a means whereby the highest dome height (as shown in FIG. 7a) delivers the lowest reverse pressure and the lowest dome height (as shown in FIG. 7b) delivers the highest reverse pressure. This inverse proportionality is clearly evident from the graph of FIG. 11 in which the abscissa represents the pressure applied to form the dome portion and the ordinate represents the reverse burst pressure. Lines X and Y thereon represent, respectively, traditional scored and unscored discs, while line Z represents a disc according to the invention, either scored or unscored.

The invention claimed is:

1. A safety pressure relief device comprising a reverse buckling rupture disc comprising:
   a) a planar annular flange portion having a first side and a second side,
   b) a central dome portion standing up from said first side of said flange portion, and
   c) an annular transition portion between said flange portion and said dome portion, said transition portion also standing up from said first side of said flange portion and joining said flange portion at a first junction and said dome portion at a second junction,
   wherein, as seen in a cross-section of the disc perpendicular to the plane of said flange portion, said transition portion is of a linear extent extending from said first junction at a first acute angle to said plane of said flange portion, and the tangent to the dome portion at said second junction makes a second acute angle with the plane of said flange portion which is greater than said first acute angle,
   said disc further having a line of weakness formed in the linear extent of the transition portion and extending around at least part of said linear extent, and
   said safety pressure relief device further having a support ring permanently fixed to said second side of said flange portion and being positioned to provide support of said first junction when reverse buckling pressure is applied to said dome portion.

2. A device as claimed in claim 1, in which said second junction is radiussed.

3. A device as claimed in claim 2, in which said first junction is a sharp corner.

4. A device as claimed in claim 1, in which said first acute angle is between 20° and 50°, and said second acute angle exceeds said first acute angle by at least 1° and by not more than about 4°.

5. A device as claimed in claim 1, in which said line of weakness is a score.

6. A safety pressure relief device comprising a reverse buckling rupture disc comprising:
   a) a planar annular flange portion having a first side and a second side,
   b) a central dome portion standing up from said first side of said flange portion, and
   c) an annular transition portion between said flange portion and said dome portion, said transition portion also standing up from said first side of said flange portion and joining said flange portion at a first junction and said dome portion at a second junction,
   wherein, as seen in a cross-section of the disc perpendicular to the plane of said flange portion, said transition portion is of a linear extent extending from said first junction at a first acute angle to said plane of said flange portion, and the tangent to the dome portion at said second junction makes a second acute angle with the plane of said flange portion which is greater than said first acute angle,
   said first junction being a sharp corner and said second junction being radiussed,
   said disc further having a line of weakness formed in the linear extent of the transition portion and extending around at least part of said linear extent, and
   said safety pressure relief device further having a support ring fixed to said second side of said flange portion and providing support of said first junction when reverse buckling pressure is applied to said dome portion.

7. A device as claimed in claim 6 in which said first acute angle is between 20° and 50°, and said second acute angle exceeds said first acute angle by at least 1° and by not more than about 40°.

8. A device as claimed in claim 6, in which said line of weakness is a score.

9. A method of manufacturing a safety pressure relief device comprising a reverse buckling rupture disc, the method comprising the steps of:
   a) providing an annular pre-form having a planar lower first surface and a hollow central interior, the circumferential inner corner of the pre-form being chamfered to provide a second surface which is linear as seen in cross-section perpendicular to said lower surface and extends at an acute angle to the plane of said lower surface,
   b) locating a circular planar disc blank having first and second sides with an annular outer region of said first side thereof abutting, to be supported by, said lower surface of the pre-form, c) shaping said disc from said disc blank by applying pressure to the disc blank at said second side thereof to form a dome portion within said hollow central interior of the pre-form, an intermediate portion of the disc blank being urged against said second surface of the pre-form to form a linear extent of the disc, with said annular outer region remaining planar as an annular flange portion of said disc, the linear extent of the disc joining said annular flange portion at a first junction and said dome portion at a second junction, wherein, as seen in a cross-section of the disc perpendicular to the plane of said flange portion, the linear extent of the disc extends from said first junction at a first acute angle to said plane of said flange portion, and the tangent to the dome portion at said second junction makes a second acute angle with the plane of the flange portion which is greater than said first acute angle, d) forming a line of weakness in the linear extent of the disc extending around part at least of said linear extent whilst said linear extent abuts said second surface of said pre-form, and e) securing a support ring flange portion to said second side of the disc subsequent to formation of said line of weakness, said support ring being positioned to provide support of said junction of said linear extent to said flange portion when reverse buckling pressure is applied to said dome portion.

* * * * *